May 19, 1925. 1,538,757
S. L. SWINDALL
COUPLING OR HITCH FOR TRACTORS
Filed Oct. 14, 1922 3 Sheets-Sheet 1
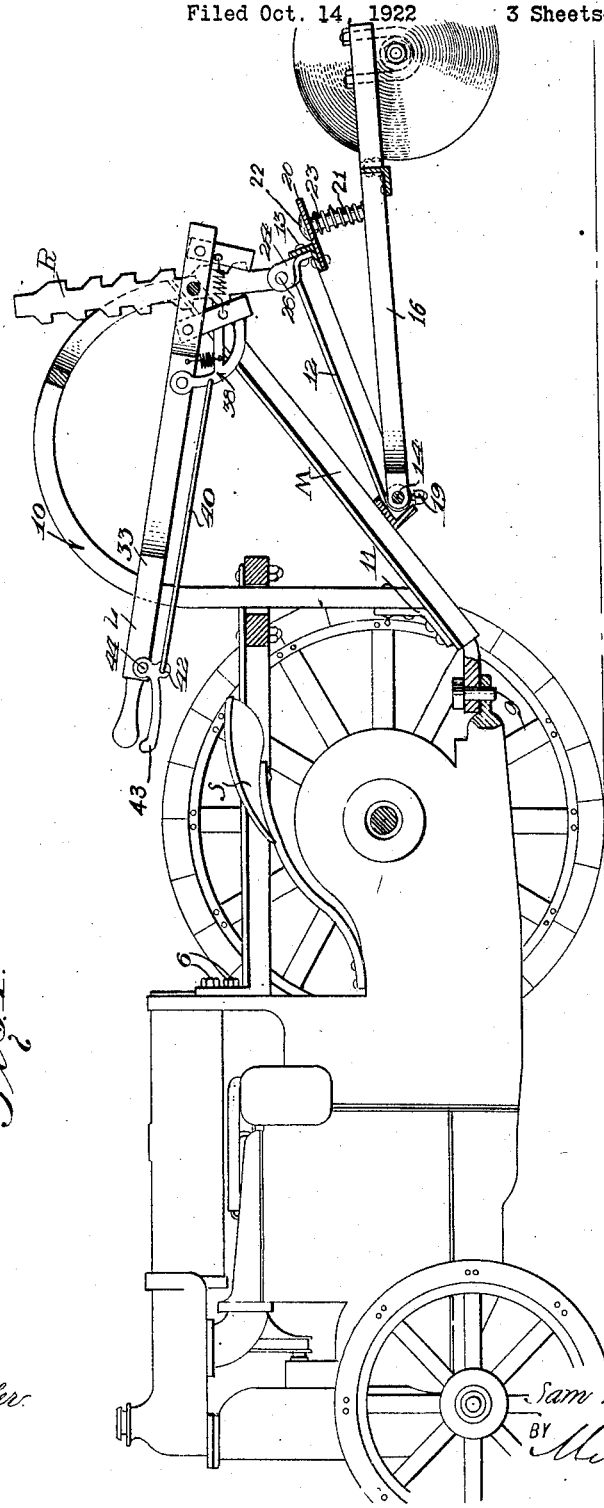
WITNESSES
M. W. Fowler
INVENTOR
Sam L. Swindall
BY
ATTORNEYS

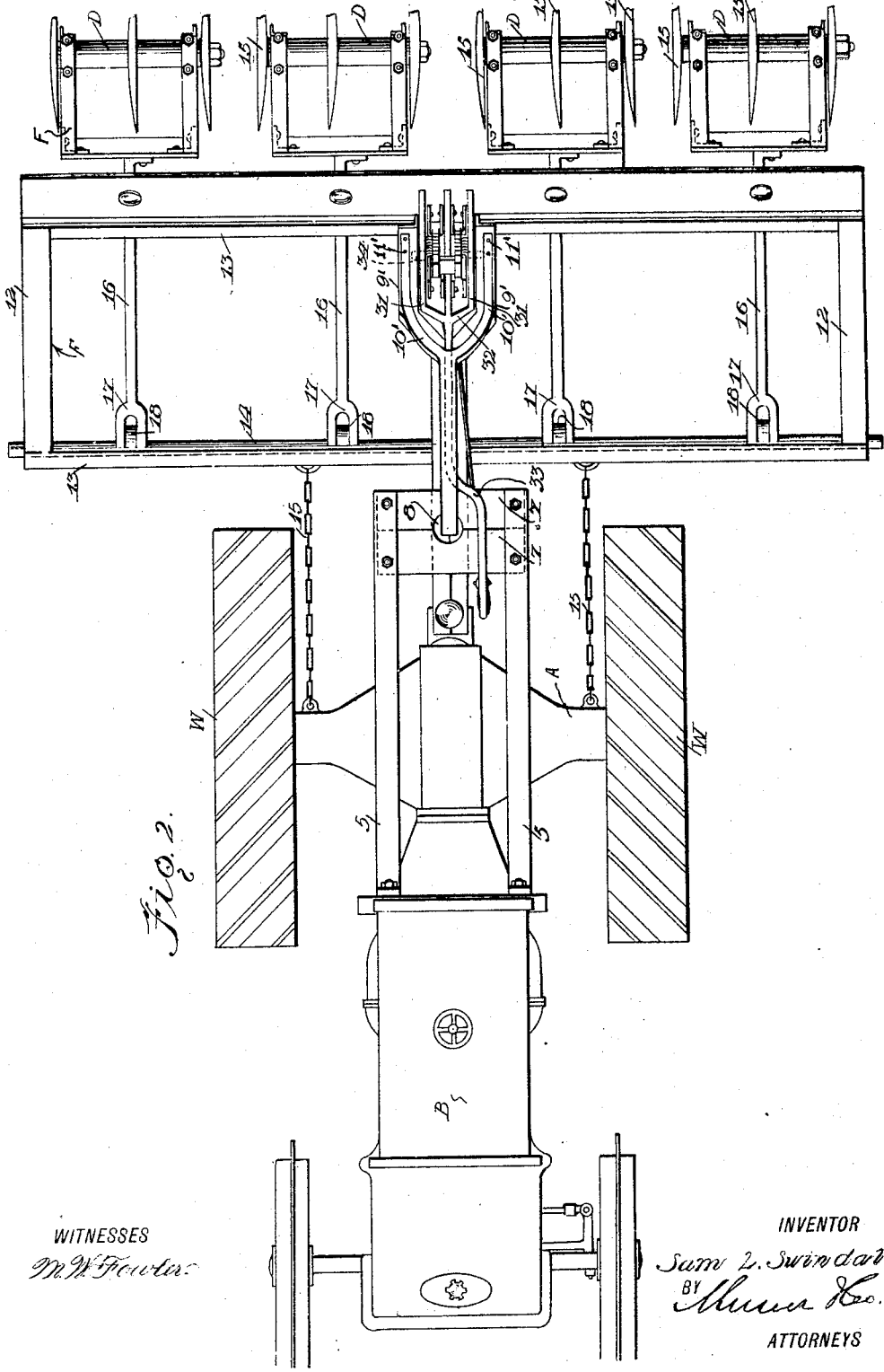

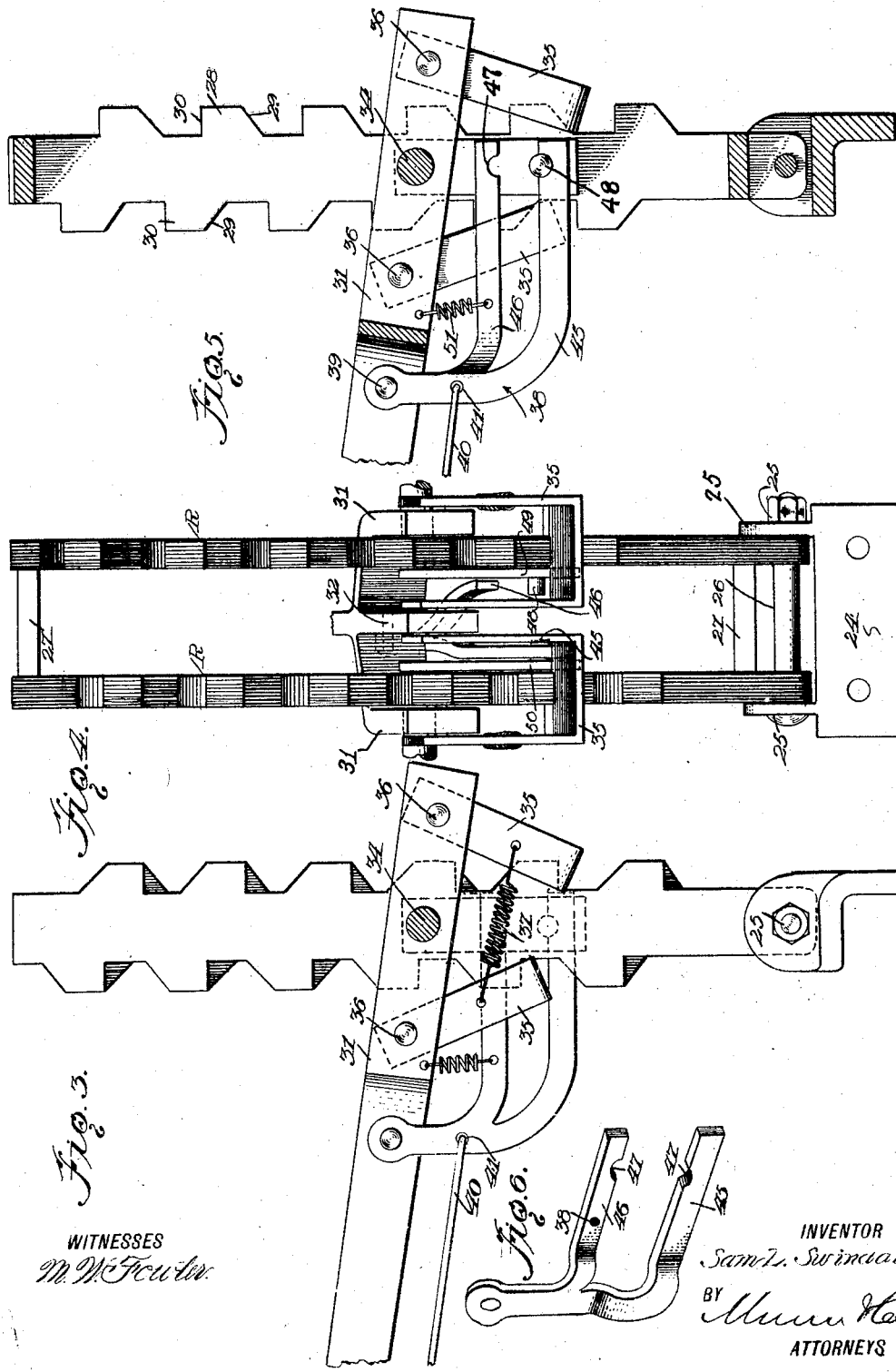

Patented May 19, 1925.

1,538,757

UNITED STATES PATENT OFFICE.

SAMUEL L. SWINDALL, OF BARE BEACH, FLORIDA.

COUPLING OR HITCH FOR TRACTORS.

Application filed October 14, 1922. Serial No. 594,596.

*To all whom it may concern:*

Be it known that I, SAMUEL L. SWINDALL, a citizen of the United States, and a resident of Bare Beach, in the county of Palm Beach and State of Florida, have invented certain new and useful Improvements in Couplings or Hitches for Tractors, of which the following is a specification.

The invention relates to a coupling or hitch for connecting farming implements to tractors.

The invention more particularly relates to a combined coupling and implement lifting means, and has for its object to provide a device of this character whereby an implement of any type may be connected to a tractor for being drawn across fields and the implement raised a sufficient degree to permit carrying thereof at the rear of the tractor free of the earth; and also facilitating the turning of the tractor in the field.

A further object of the invention is that the device be adapted to be attached to any standard form of tractor and operated from the driver's position upon the tractor.

It is also within the scope of the objects of the invention that the device be simple in construction and easy to manipulate.

Other objects, and objects relating to details of construction will hereinafter appear in the detailed description to follow.

The invention is illustrated by way of example in the accompanying drawings, in which:—

Figure 1 is a view in side elevation of a tractor and showing a farming implement attached thereto by means of the present invention, the connecting and lifting means for the implement being shown in section, taken vertically and longitudinally therethrough, Figure 2 is a top plan view of the same, Figure 3 is a detailed view in side elevation illustrating the operating means of the lifting jack, Figure 4 is a rear elevation of the same, Figure 5 is a vertical section of the same, and Figure 6 is a detailed perspective view of a latch element employed upon the lifting jack.

Referring to the drawings more particularly in Figures 1 and 2, B indicates generally the body of a tractor and W the rear wheels thereof, and at A is indicated the rear axle housing which may be of any desired construction.

In carrying out the present invention there is secured to the body of the tractor a pair of elongated angle members 5, said members being provided with suitable lugs at the forward ends whereby they may be secured to the body of the tractor by bolts as at 6. The members 5 extend rearwardly and beyond the seat S of the tractor and between the rear ends of these members there is secured a pair of plates 7 having a recess occurring upon opposing edges to provide an opening as at 8. A supporting member generally designated by the reference character M is pivotally secured to the draw bar attachment of the tractor by a king pin 9. A bow-shaped brace 10' has its one end secured to the forward end of the member M as at 11. This member extends through the opening 8. The member M terminates at its rear end in a pair of supporting arms 9'. The rear end of the member 10 also terminates in a pair of arms or prongs 10' which are secured to the arms of the member M as at 11'.

In the present instance the implement shown as being coupled to a tractor consists of four disk-harrow or plow units D which are connected to a frame generally indicated by the reference character F. The frame F is rectangular in shape and comprises the two end sections 12 and the two side sections 13. The members 12 and 13 are preferably of angle iron. The forward frame member 13 is secured to the axle housing A of the tractor by means of a pair of chains 15, said chains being preferably arranged, as shown, so that the frame may be held from swinging in contact with the rear wheels. The forward frame member 13 is secured to the member M in any approved manner. Also this member 13 supports a rod 14.

Each disk harrow unit D may comprise a number of discs 15 which may be properly secured to a frame $F^1$. Each frame $F^1$ has extending therefrom a tongue 16 which is bifurcated at its forward end to provide a pair of prongs 17. The pair of prongs 17 of each tongue are provided with suitable openings to permit the passage of rod 14. A collar 18 is positioned between each pair of prongs 17 and each collar is adjustably held upon the rod 14 by a set screw 19, thereby to permit the tongues 16 to be adjusted longitudinally of rod 14.

To the rear frame member 13 there is secured a plate member 20; and from each tongue there extends upwardly a pin 21 which passes through the plate 20 and is formed with a head 22 whereby to limit the downward movement of the tongue. Each pin or post 21 is encircled by a coil spring 23 for a purpose which will later be described.

A plate 24 is bolted to the rear frame member 13 and said plate provided with a pair of ears 25 through which pass a bolt 26. A pair of rack bars R are pivotally connected at similar ends to the bolt 26. The ends of rack bars R are secured together by rods or bolts 27 so that the opposing sides are in predetermined spaced relation. Both rack bars have each of their longitudinal edges formed with a series of teeth 28, each tooth being flat or rounded at its outer end and having the two edges or faces 29 and 30. The face 29 in each instance is inclined, while the face 30 is substantially at right angles to the longitudinal axis of the rack member. The teeth of one rack bar have their inclined face 32 occurring upon the opposite sides with respect to the same inclined face of the teeth occurring upon the other rack bar as shown to advantage in Figure 4 of the drawings.

A hand lever L is provided, said lever terminating at its lower end in a pair of outer prongs 31 and a central prong 32. The hand lever is preferably curved as at 33 in order that the same may clear the brace 10. The free ends of lever prongs 31 are pivotally connected to arms 9′, of member M by pins 34. Each arm or bar 31 carries a pair of latch members 35, said latch members in each instance being U-shaped and having one leg pivotally connected to the associated arm 31 as at 36 and its other leg similarly connected to the central prong 32 as shown in Figure 4. Each pair of latch members are connected together by the means of a coil spring 37.

The lower end portion of the lever L has pivoted thereto a lifter 38, said lifter being pivotally supported by pin 39 and pivotally connected to the one end of a rod 40 as at 41. The rod 40 has its other end pivotally connected as at 42 to a trigger 43 which is pivotally connected to the lever L at a point adjacent the free end of said lever as at 44. The member 38 has its free end portion formed with a pair of prongs 45 and 46, each prong being formed with a semicircular recess 47. The prong 45 is adapted to be brought to engage a pin 48 carried by a plate 49, while the prong 46 is adapted to engage a similar pin carried by a plate 50. The plates 49 and 50 are pivotally supported for swinging movement by the pins 34. The prong 46 is connected to a side lever prong 31 by a coil spring 51.

In the use of the present invention, the disk units D are connected to a tractor in the manner heretofore described. The hand lever L may be positioned so that the rear end of the frame F will press downwardly upon the springs 30 and thus supply a certain pressure to the disk units D. When it is desired to lift the different disk units D the lever L is raised and lowered without operating the member 38. Upon downward movement of the lever bar L, a latch member 35 of one of the arms 31 will engage with the teeth 31, 30 of the associated rack bar R and thus move the rack bars R upwardly and in so doing raise the disk units D upwardly. Upward movement of the hand lever L will cause the opposite latch on the same rack bar to move the rack bars R in the same direction and thus further lift the disk units D.

When it is desired to lower the disk units D, the member 38 is operated together with the lever bar L. By moving the lever bar L downward and also operating trigger 43, the plate member 50 will release the latch member 35 of the associated lever prong 31 and permit downward movement of the rack bars R and disk units D. Upon upward movement of lever L the pair of latch members 35 of remaining lever prong 31 are released and further downward movement by rack bars R occurs.

It is to be understood that the present invention is not limited to use with the type of farm implement shown, also; while I have shown and described the preferred form of my invention, I wish it to be understood that I am aware of the fact that the construction, combination and arrangement of parts may be changed by those skilled in the art without departing from the spirit of the invention as indicated by the appended claim.

I claim:—

In combination with a tractor, supporting means mounted on said tractor, a main frame having flexible connections to the tractor, means carried by the supporting means for positively lowering and elevating the main frame, an earth working element, a tongue pivotally connected at its forward end to the main frame and carrying the earth working element at its rear end, and resilient connecting means between the main frame and the intermediate portion of the tongue for pressing the same downwardly.

SAMUEL L. SWINDALL.